United States Patent
Wen et al.

(10) Patent No.: US 10,627,590 B2
(45) Date of Patent: Apr. 21, 2020

(54) OPTICAL CABLE SEALING METHOD AND OPTICAL CABLE SEALING STRUCTURE

(71) Applicant: AMPHENOL FIBER OPTIC TECHNOLOGY (SHENZHEN) CO., LTD., Shenzhen, Guangdong Province (CN)

(72) Inventors: Jun Wen, Shenzhen (CN); Songsheng Li, Shenzhen (CN); Anh Nguyen, Shenzhen (CN); Shu-Hui Hsu, Kaohsiung (TW)

(73) Assignee: Amphenol Fiber Optic Technology (Shenzhen) Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 15/974,046

(22) Filed: May 8, 2018

(65) Prior Publication Data

US 2019/0162922 A1 May 30, 2019

(30) Foreign Application Priority Data

Nov. 30, 2017 (TW) .............................. 106141883 A
Jan. 10, 2018 (TW) .............................. 107100876 A

(51) Int. Cl.
*G02B 6/44* (2006.01)
(52) U.S. Cl.
CPC ......... *G02B 6/4432* (2013.01); *G02B 6/4476* (2013.01); *G02B 6/4486* (2013.01)

(58) Field of Classification Search
CPC ............................ G02B 6/4432; G02B 6/4486
USPC ........................................................ 385/100
See application file for complete search history.

(56) References Cited

U.S. PATENT DOCUMENTS

| 5,598,500 | A | * | 1/1997 | Crespel | ................ | G02B 6/4471 |
| | | | | | | 385/100 |
| 7,272,282 | B1 | * | 9/2007 | Seddon | ................ | G02B 6/4475 |
| | | | | | | 385/100 |
| 2001/0023920 | A1 | * | 9/2001 | Ando | ................... | G02B 6/4201 |
| | | | | | | 250/227.11 |
| 2014/0241674 | A1 | * | 8/2014 | Isenhour | ............. | G02B 6/4284 |
| | | | | | | 385/93 |
| 2018/0231729 | A1 | * | 8/2018 | Baetz | ................... | G02B 6/4435 |

* cited by examiner

*Primary Examiner* — Jerry M Blevins
(74) *Attorney, Agent, or Firm* — Muncy, Geissler, Olds & Lowe, P.C.

(57) ABSTRACT

A method of sealing an optical cable is disclosed. The optical cable includes an outer jacket defining an interior space, an optical fiber assembly disposed in the interior space, and a plurality of reinforcing filaments disposed in the interior space between the outer jacket and the optical fiber assembly. The method includes the steps of peeling off one end of the outer jacket to expose one end of the optical fiber assembly and one ends of the reinforcing filaments, and introducing an adhesive into the interior space through an opening formed in the outer jacket when the one end of the outer jacket is peeled off so as to seal the opening and to fix the positions of the reinforcing filaments and the optical fiber assembly.

3 Claims, 10 Drawing Sheets

OPTICAL CABLE SEALING METHOD AND OPTICAL CABLE SEALING STRUCTURE

CROSS-REFERENCE TO RELATED APPLICATION

This application claims priority of Taiwanese Patent Application No. 106141883, filed on Nov. 30, 2017 and Taiwanese Patent Application No. 107100876, filed on Jan. 10, 2018.

FIELD

The disclosure relates to an optical cable construction and structure, more particularly to an optical cable sealing method and an optical cable sealing structure.

BACKGROUND

When an optical cable is disposed in a humid environment, moisture may penetrate the optical cable through one end thereof, thereby affecting the optical fibers inside the optical cable. Moreover, when the optical cable communicates in cooperation with the optical fibers in a vacuum environment, there is also a need to perform a sealing operation on a specific portion of the optical cable to prevent circulation of air through an interior space of the optical cable.

SUMMARY

Therefore, an object of the present disclosure is to provide a method of sealing an optical cable that can alleviate at least one of the drawbacks of the prior art.

Accordingly, a method of sealing an optical cable of this disclosure is disclosed. The optical cable includes an outer jacket defining an interior space, an optical fiber assembly disposed in the interior space, and a plurality of reinforcing filaments disposed in the interior space between the outer jacket and the optical fiber assembly. The method includes:

step S1: peeling off one end of the outer jacket to expose one end of the optical fiber assembly and one ends of the reinforcing filaments; and step S2: introducing an adhesive into the interior space through an opening formed in the outer jacket when the one end of the outer jacket is peeled off so as to seal the opening and to fix the positions of the reinforcing filaments and the optical fiber assembly.

Another object of this disclosure is to provide an optical cable sealing structure that can alleviate at least one of the drawbacks of the prior art.

Accordingly, an optical cable sealing structure of this disclosure includes an optical cable, a reinforcing unit and an adhesive. The optical cable includes an outer jacket defining an interior space and having two opposite openings communicating with the interior space, an optical fiber assembly disposed in the interior space and having one end extending out of the interior space through one of the openings of the outer jacket, and a plurality of reinforcing filaments disposed in the interior space between the outer jacket and the optical fiber assembly and having one ends extending out of the interior space through the one of the openings of the outer jacket. The reinforcing unit is connected to the optical cable and includes an outer tubular sleeve that defines an insertion space, and a plurality of first fiber filaments disposed in the insertion space and having one ends extending out of the insertion space. The one end of the optical fiber assembly is inserted into the insertion space and is surrounded by the first fiber filaments. The adhesive seals the one of the openings of the outer jacket and connects the one ends of the reinforcing filaments and the one ends of the first fiber filaments.

Yet another object of this disclosure is to provide a method of sealing an optical cable that can alleviate at least one of the drawbacks of the prior art.

Accordingly, a method of sealing an optical cable of this disclosure is disclosed. The optical cable includes an outer jacket defining an interior space, an optical fiber assembly disposed in the interior space, and a plurality of reinforcing filaments disposed in the interior space between the outer jacket and the optical fiber assembly. The method includes:

step A: forming a hole in the outer jacket such that the hole communicates with the interior space; and step B: introducing an adhesive into the interior space through the hole so as to fix the positions of the optical fiber assembly and the reinforcing filaments, to axially block the interior space, and to seal the hole.

Still another object of this disclosure is to provide an optical cable sealing structure that can alleviate at least one of the drawbacks of the prior art.

Accordingly, an optical cable sealing structure of this disclosure includes an optical cable and an adhesive. The optical cable includes an outer jacket defining an interior space and formed with a hole communicating with the interior space, an optical fiber assembly disposed in the interior space, and a plurality of reinforcing filaments disposed in the interior space between the outer jacket and the optical fiber assembly. The adhesive is introduced into the interior space through the hole so as to fix the positions of the optical fiber assembly and the reinforcing filaments, to axially block the interior space, and to seal the hole.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
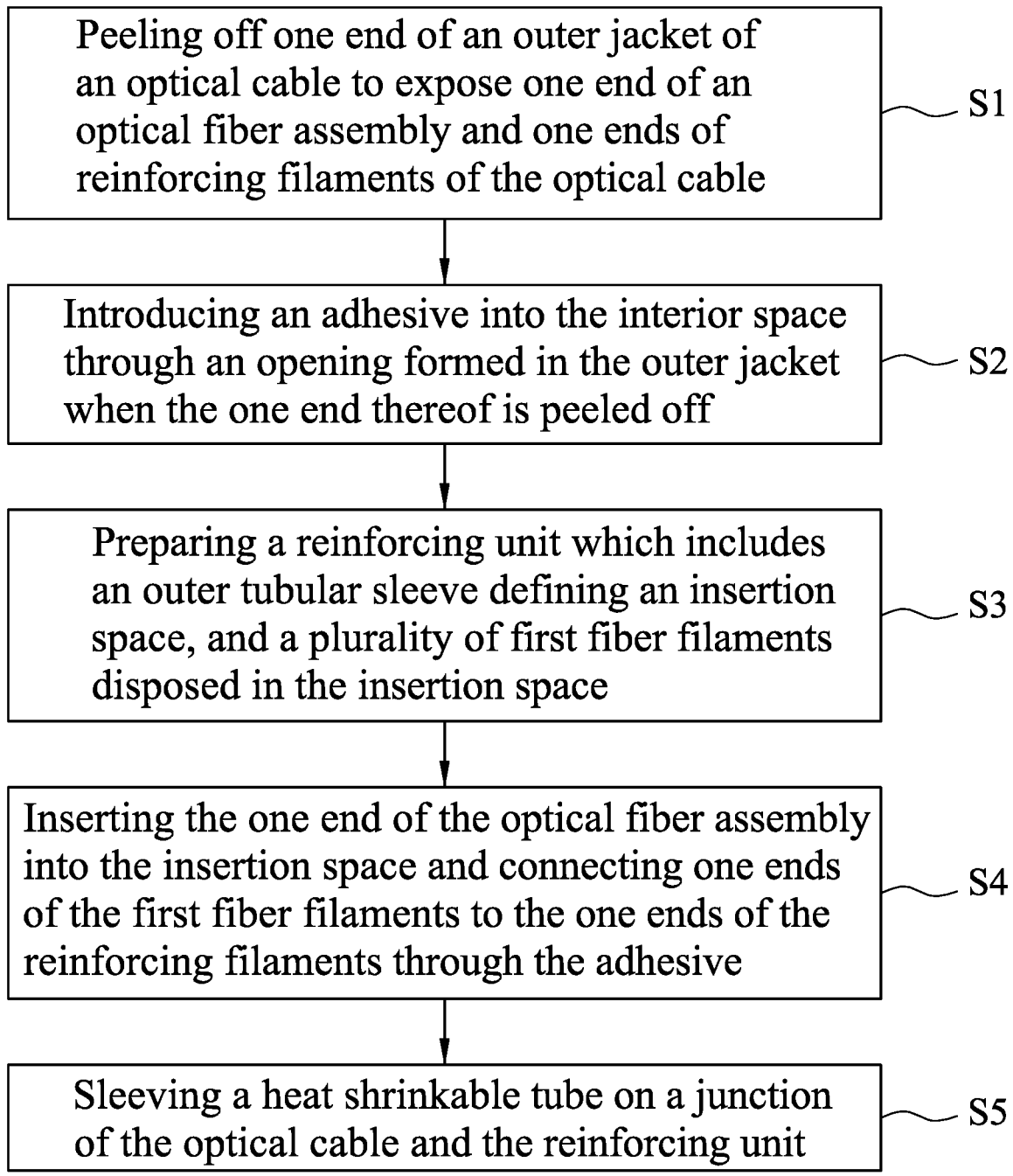
FIG. 1 is a flow chart, illustrating the steps involved in a method of sealing an optical cable according to the first embodiment of the present disclosure.

Before the present disclosure is described in greater detail with reference to the accompanying embodiments, it should be noted herein that like elements are denoted by the same reference numerals throughout the disclosure.

Referring to FIG. 1, a method of sealing an optical cable 9 according to the first embodiment of the present disclosure is shown to include steps S1 to S5. The optical cable 9 includes an outer jacket 91 defining an interior space 910, an optical fiber assembly 92 disposed in the interior space 910, and a plurality of reinforcing filaments 93 disposed in the interior space 910 between the outer jacket 91 and the optical fiber assembly 92. In this embodiment, the optical fiber assembly 92 only includes at least one optical fiber bundle 922. The reinforcing filaments 93 are made of a strong material, and have an effect of protecting the optical fiber assembly 92. Further, through the tensile properties of the reinforcing filaments 93, the reinforcing filaments 93 can provide a supporting effect to reduce the pulling force borne by the optical fiber assembly 92 when the optical cable 9 is pulled. The steps of the method of the first embodiment will be described in combination with FIGS. 2 and 3.

In step S1, one end of the outer jacket 91 is peeled off in a conventional manner to expose one end of the at least one optical fiber bundle 922 and one ends of the reinforcing filaments 93.

In step S2, an adhesive 3 is introduced into the interior space 910 through an opening 911 formed in the outer jacket 91 when the one end thereof is peeled off so as to seal the opening 911 and to fix the positions of the at least one optical fiber bundle 922 and the reinforcing filaments 93. The adhesive 3 is preferably made of epoxy resin to achieve a good sealing effect. However, the adhesive 3 may be made of other similar materials, and is not limited to what is disclosed herein.

In step S3, a reinforcing unit 4 is prepared. The reinforcing unit 4 includes an outer tubular sleeve 41 defining an insertion space 410, and a plurality of first fiber filaments 42 disposed in the insertion space 410 and having one ends extending out of the insertion space 410. The first fiber filaments 42 are made of a material similar that of the reinforcing filaments 93, and have the same effect of protecting internal wires. It should be noted herein that the reinforcing unit 4 is configured to be connected to an electronic device, such as a computer, a television or other telecommunication equipment.

In step S4, the one end of the at least one optical fiber bundle 922 is inserted into the insertion space 410, and the one ends of the first fiber filaments 42 are connected to the one ends of the reinforcing filaments 93 through the adhesive 3 so that they can protect the at least one optical fiber bundle 922 together.

In step S5, a heat shrinkable tube 5 is sleeved on a junction of the optical cable 9 and the reinforcing unit 4. The heat shrinkable tube 5 is heated to shrink and clamp the junction of the optical cable 9 and the reinforcing unit 4 to further strengthen the connection between the two. Apart from strengthening the stability of the structure, the heat shrinkable tube 5 can also isolate the adhesive 3 from the external environment to prevent external moisture and air from deteriorating the adhesive 3. An optical cable sealing structure of the first embodiment is completed, as shown in FIG. 3.

Figure 2:
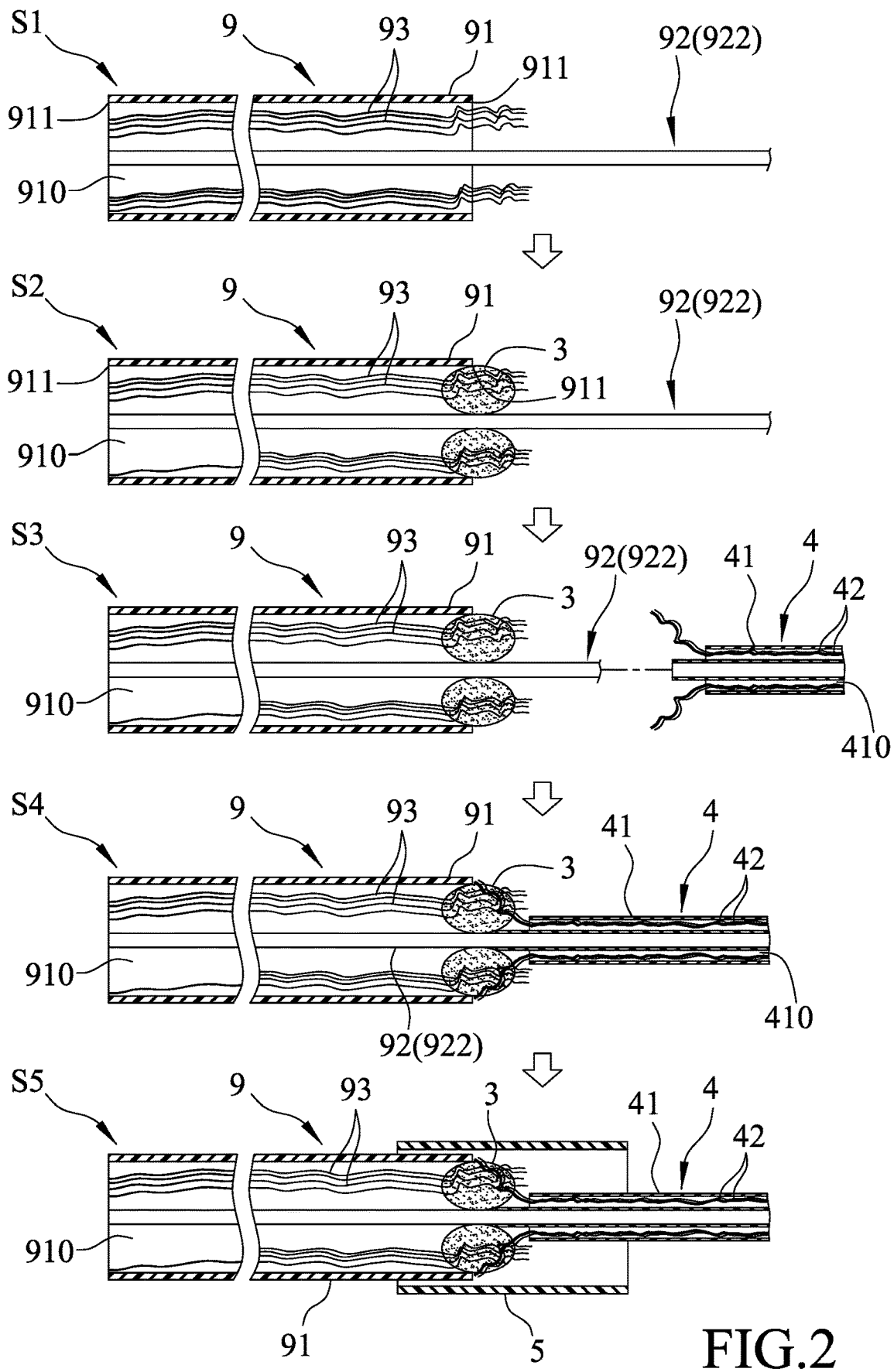
FIG. 2 illustrates the consecutive steps of the method of the first embodiment.
Figure 3:
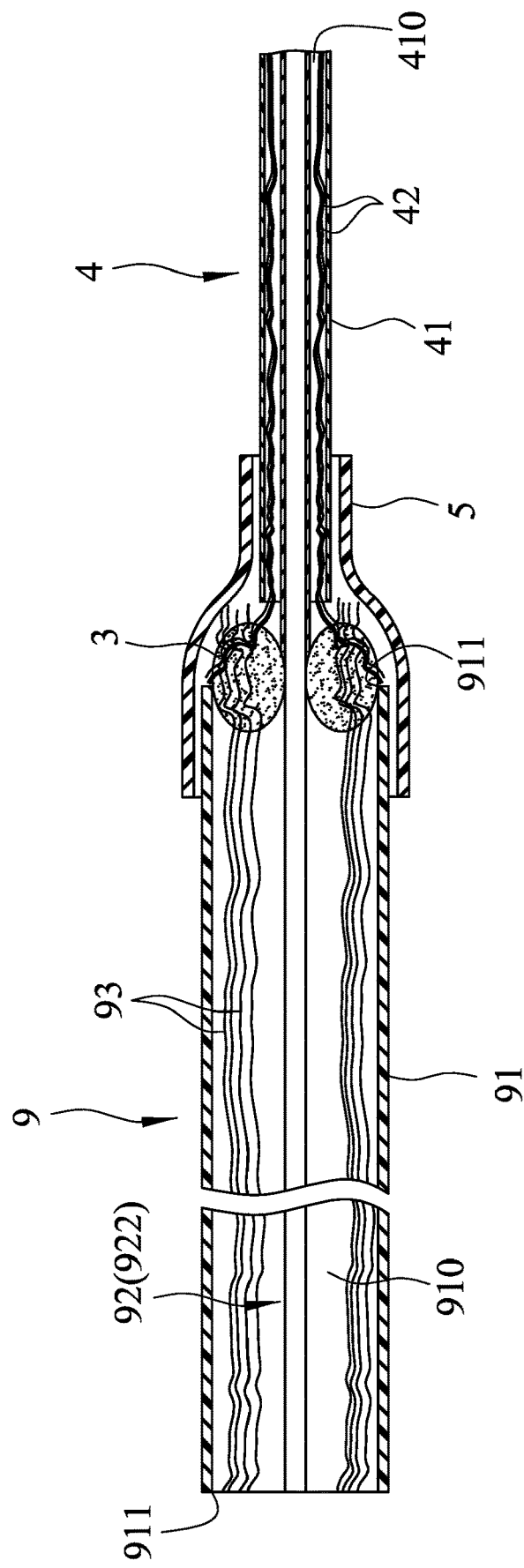
FIG. 3 is a sectional view of an optical fiber sealing structure of the first embodiment.

With reference to FIG. 3, in combination with FIG. 2, the optical cable sealing structure of the first embodiment includes the optical cable 9, the reinforcing unit 4, the adhesive 3 and the heat shrinkable tube 5. The outer jacket 91 of the optical cable 9 has two opposite openings 911 communicating with the interior space 910. The at least one optical fiber bundle 922 of the optical fiber assembly 92 has the one end extending out of one of the openings 911, inserted into the insertion space 410 of the outer tubular sleeve 41 of the reinforcing unit 4, and surrounded by the first fiber filaments 42. The reinforcing filaments 93 have the one ends extending out of the one of the openings 911 and fixed to the adhesive 3. The first fiber filaments 42 have the one ends extending out of the insertion space 410 and connected to the one ends of the reinforcing filaments 93 through the adhesive 3. Since the adhesive 3 forms an axial block in the interior space 910, even if there is moisture or other foreign objects, such as dust, enters the interior space 910 through the opening 911 in the outer jacket 91 that is opposite to the adhesive 3, it will still be blocked by the adhesive 3, so that the moisture or dust cannot enter the reinforcing unit 4, thereby protecting the electronic device connected to the reinforcing unit 4. Moreover, the reinforcing unit 4 is sleeved on and covers the one end of the at least one optical fiber bundle 922 exposed from the outer jacket 91 to provide an extra protecting effect and enhance the overall structural strength of the optical cable sealing structure of this disclosure. Finally, through the fixing of the heat shrinkable tube 5 and with the heat shrinkable tube 5 protecting the adhesive 3, the overall structural strength and sealing of the optical cable sealing structure of this disclosure can be further enhanced during use thereof.

Figure 4:
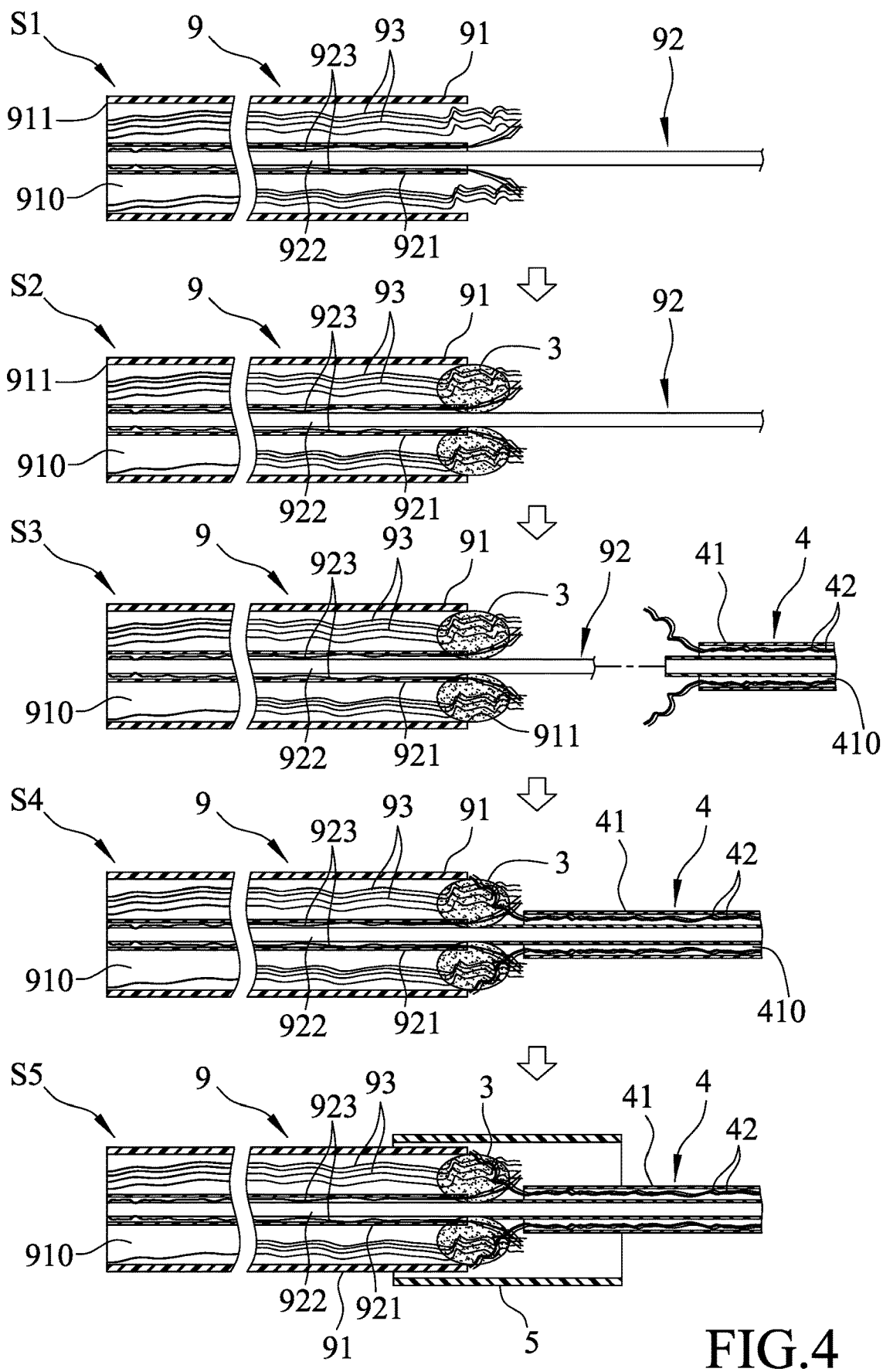
FIG. 4 illustrates the consecutive steps of a method of sealing an optical cable according to the second embodiment of this disclosure.

FIG. 4 illustrates the second embodiment of the method of sealing the optical cable 9 of this disclosure. In this embodiment, the optical fiber assembly 92 includes an inner jacket 921, the at least one optical fiber bundle 922 disposed in the inner jacket 921, and a plurality of second fiber filaments 923 disposed between the inner jacket 921 and the at least one optical fiber bundle 922. The method of the second embodiment differs from that of the first embodiment in that:

in step S1, one end of the inner jacket 921 and one end of the outer jacket 91 are peeled off to expose one ends of the reinforcing filaments 93, one end of the at least one optical fiber bundle 922 and one ends of the second fiber filaments 923;

in step S2, the adhesive 3 is introduced into the interior space 910 through the opening 911 formed in the outer jacket 91 when the one end thereof is peeled off so as to seal the opening 911 and to fix the positions of the reinforcing filaments 93, the at least one optical fiber bundle 922 and the second fiber filaments 923; and in step S4, the one end of the at least one optical fiber bundle 922 is inserted into the insertion space 410 of the outer tubular sleeve 41 of the reinforcing unit 4, and the one ends of the first fiber filaments 42 of the reinforcing unit 4 are connected to the one ends of the reinforcing filaments 93 and the one ends of the second fiber filaments 923 through the adhesive 3. An optical fiber sealing structure of the second embodiment is completed, as shown in FIG. 5.

Figure 5:
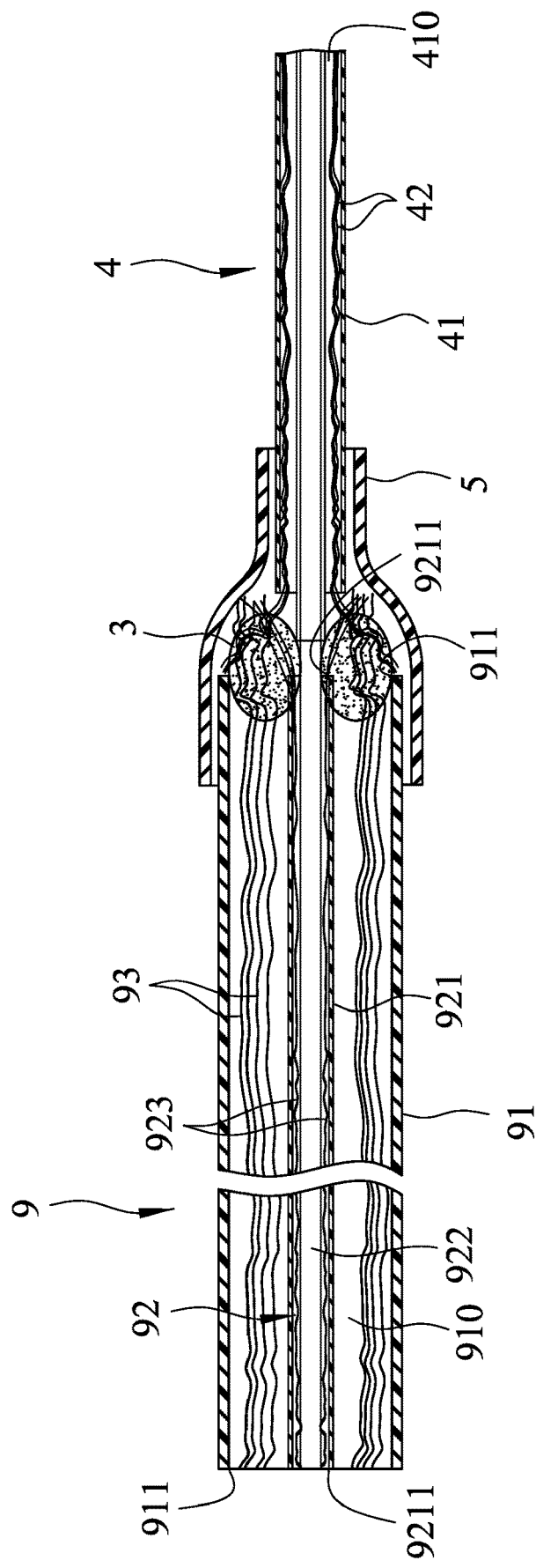
FIG. 5 is a sectional view of an optical fiber sealing structure of the second embodiment.

With reference to FIG. 5, the optical cable sealing structure of the second embodiment is substantially identical to that of the first embodiment, and differs in that the optical fiber assembly 92 includes the inner jacket 921, the at least one optical fiber bundle 922 disposed in the inner jacket 921, and the second fiber filaments 923 disposed between the inner jacket 921 and the at least one optical fiber bundle 922. The inner jacket 921 has two opposite openings 9211. The at least one optical fiber bundle 922 has one end extending out of one of the openings 9211 and inserted into the insertion space 410 of the outer tubular sleeve 41. The second fiber filaments 923 also have one ends extending out of the one of the openings 9211 and adhered to the adhesive 3 so as to be connected with the one ends of the reinforcing filaments 93 and the one ends of the first fiber filaments 42.

The optical cable sealing structure of the second embodiment can achieve the same effect as that of the first embodiment, and the at least one optical fiber bundle 922 can be more completely protected through the inner jacket 921 and the second fiber filaments 923.

Figure 6:
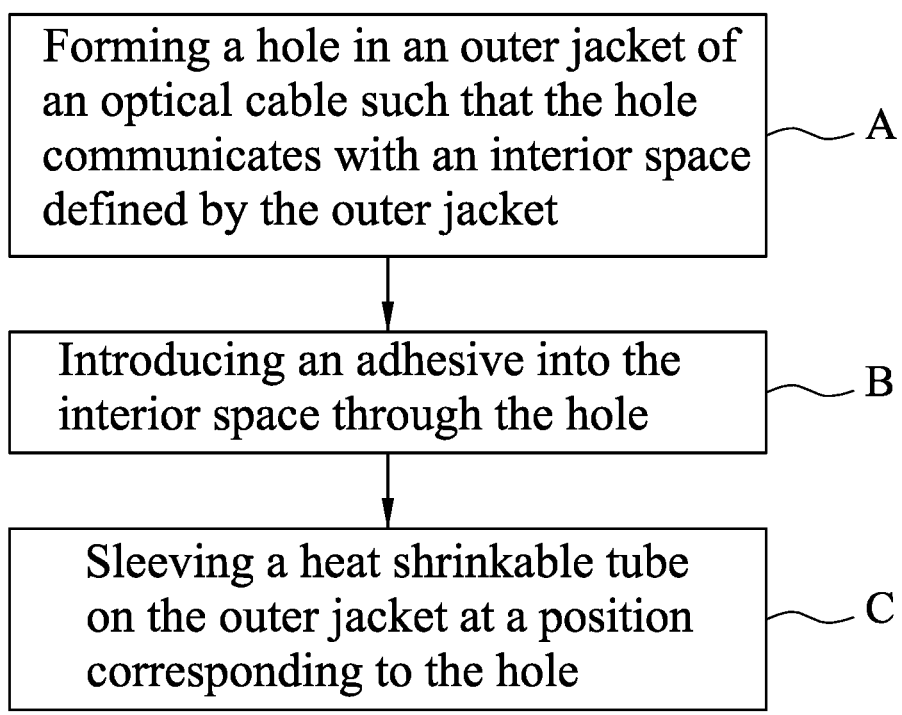
FIG. 6 is a flow chart, illustrating the steps involved in a method of sealing an optical cable according to the third embodiment of the present disclosure.
Figure 7:
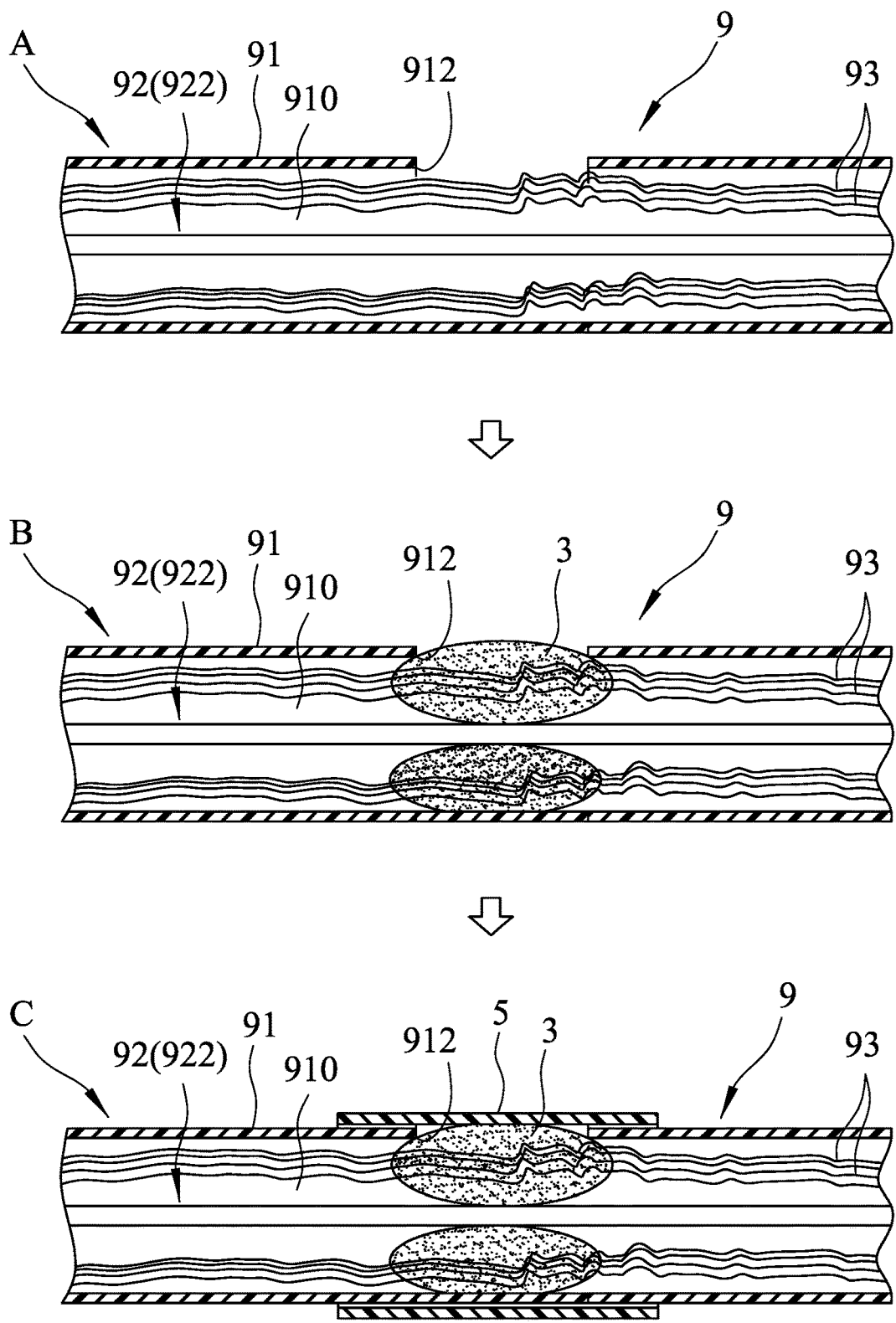
FIG. 7 illustrates the consecutive steps of the method of the third embodiment.

Referring to FIGS. 6 and 7, the third embodiment of the method of sealing the optical cable 9 of this disclosure is shown to include steps A to C. The optical cable 9 of this embodiment is similar to that of the first embodiment, and the optical fiber assembly 92 thereof only includes the at least one optical fiber bundle 922.

In step A, the outer jacket 91 of the optical cable 9 is formed with a hole 912 such that the hole 912 communicates with the interior space 910 of the outer jacket 91.

In step B, the adhesive 3 is introduced into the interior space 910 through the hole 912 so as to fix the positions of the at least one optical fiber bundle 922 and the reinforcing filaments 93, to axially block the interior space 910, and to seal the hole 912.

In step C, the heat shrinkable tube 5 is sleeved on the outer jacket 91 at a position corresponding to the hole 912, and is heated to shrink and clamp the outer jacket 91 so as to cover the hole 912. An optical cable sealing structure of the third embodiment is completed, as shown in FIG. 8.

Figure 8:
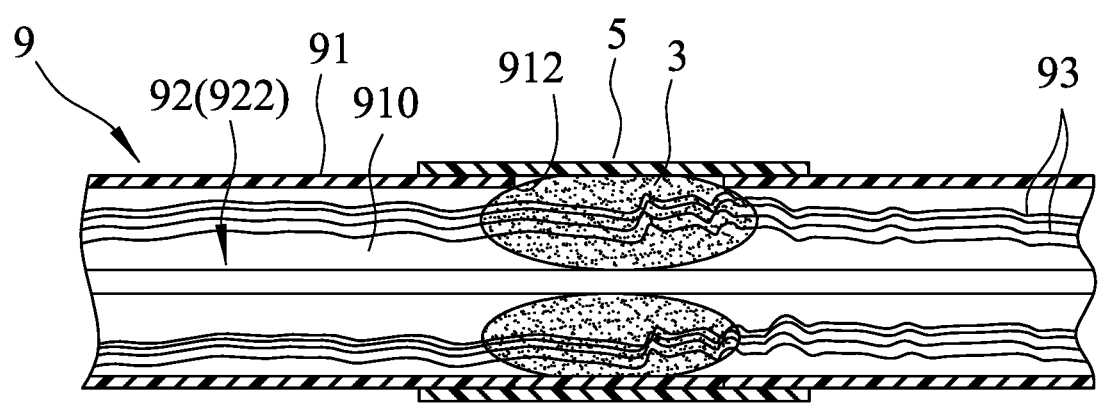
FIG. 8 is a sectional view of an optical fiber sealing structure of the third embodiment.

With reference to FIG. 8, the optical cable sealing structure of the third embodiment includes the optical cable 9, the adhesive 3, and the heat shrinkable tube 5. Apart from fixing the relative positions of the at least one optical fiber bundle 922 and the reinforcing filaments 93, the adhesive 3 can also form an axial barrier in a central specific area of the interior space 910. The advantage of the third embodiment resides in that a position can be directly selected according to the requirements in which the adhesive 3 can create a barrier so as to match the requirements of the network configuration and use environment.

Figure 9:
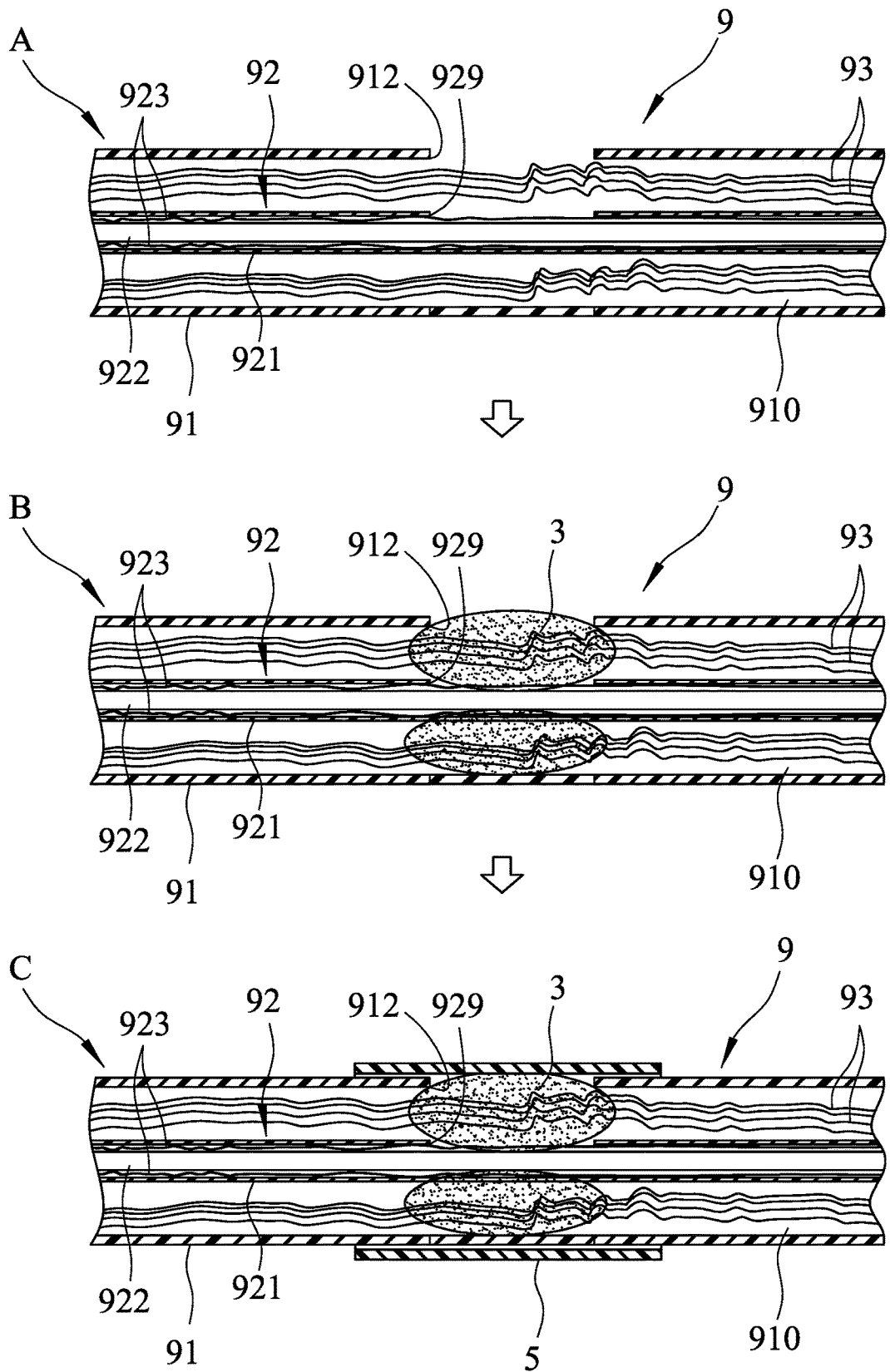
FIG. 9 illustrates the consecutive steps of a method of sealing an optical cable according to the fourth embodiment of this disclosure.
Figure 10:
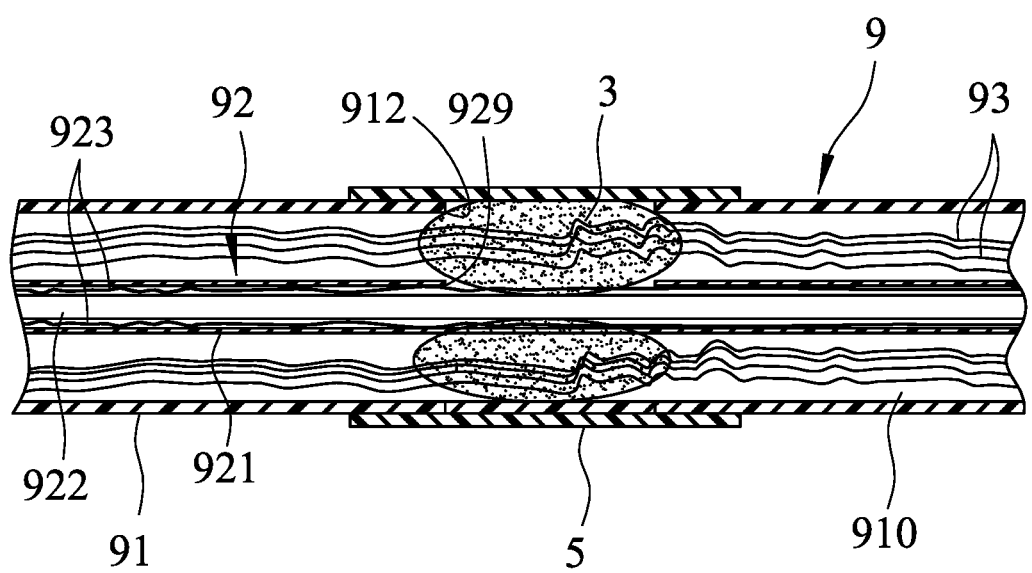
FIG. 10 is a sectional view of an optical fiber sealing structure of the fourth embodiment.

FIG. 9 illustrates the fourth embodiment of the method of sealing the optical cable 9 of this disclosure. In this embodiment, the optical fiber assembly 92 includes an inner jacket 921, the at least one optical fiber bundle 922 disposed in the inner jacket 921, and a plurality of second fiber filaments 923 disposed between the inner jacket 921 and the at least one optical fiber bundle 922. The method of the fourth embodiment differs from that of the third embodiment in that:

in step A, apart from forming the hole 912 in the outer jacket 91 of the optical cable 9, the inner jacket 921 is also formed with a hole 929 facing the hole 912 in the outer jacket 91; and in step B, the hole 912 in the outer jacket 91 and the hole 929 in the inner jacket 921 are sealed by the adhesive 3. An optical cable sealing structure of the fourth embodiment is completed, as shown in FIG. 10.

Apart from achieving the same effect as that of the third embodiment, the optical cable sealing structure of the fourth embodiment can further protect the at least one optical fiber bundle 922 through the inner jacket 921 and the second fiber filaments 923.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method of sealing an optical cable which includes an outer jacket defining an interior space, an optical fiber assembly disposed in the interior space, and a plurality of reinforcing filaments disposed in the interior space between the outer jacket and the optical fiber assembly, said method comprising:

step S1: peeling off one end of the outer jacket to expose one end of the optical fiber assembly and one ends of the reinforcing filaments;

step S2: introducing an adhesive into the interior space through an opening formed in the outer jacket when the one end of the outer jacket is peeled off so as to seal the opening and to fix the positions of the reinforcing filaments and the optical fiber assembly;

step S3: preparing a reinforcing unit which includes an outer tubular sleeve defining an insertion space, and a plurality of first fiber filaments disposed in the insertion space and having one ends extending out of the insertion space;

step S4: inserting the one end of the optical fiber assembly into the insertion space, and connecting the one ends of the first fiber filaments to the one ends of the reinforcing filaments through the adhesive; and step S5: sleeving a heat shrinkable tube on a junction of the optical cable and the reinforcing unit.

2. The method of sealing an optical cable as claimed in claim 1, wherein:

the optical fiber assembly includes an inner jacket, at least one optical fiber bundle disposed in the inner jacket, and a plurality of second fiber filaments disposed between the inner jacket and the at least one optical fiber bundle;

in step S1, one end of the inner jacket is peeled off to expose one end of the at least one optical fiber bundle and one ends of the second fiber filaments;

in step S2, the adhesive fixes the position of the at least one optical fiber bundle and the second fiber filaments; and in step S4, the one end of the at least one optical fiber bundle is inserted into the insertion space, and the one ends of the second fiber filaments are connected to the one ends of the reinforcing filaments and the one ends of the first fiber filaments through the adhesive.

3. An optical cable sealing structure obtained using the method as claimed in claim 1, comprising:

the optical cable including the outer jacket that defines the interior space and that has two opposite openings communicating with the interior space, the optical fiber assembly disposed in the interior space and having the one end extending out of the interior space through one of the openings of the outer jacket, and the plurality of the reinforcing filaments having the one ends extending out of the interior space through said one of the openings of the outer jacket;

the reinforcing unit connected to the optical cable and including the outer tubular sleeve and the plurality of the first fiber filaments, the one end of the optical fiber assembly being inserted into the insertion space and being surrounded by the first fiber filaments;

the adhesive sealing the one of the openings of the outer jacket and connecting the one ends of the reinforcing filaments and the one ends of the first fiber filaments; and the heat shrinkable tube sleeved on the junction of the optical cable and the reinforcing unit.

\* \* \* \* \*